Figure 1:
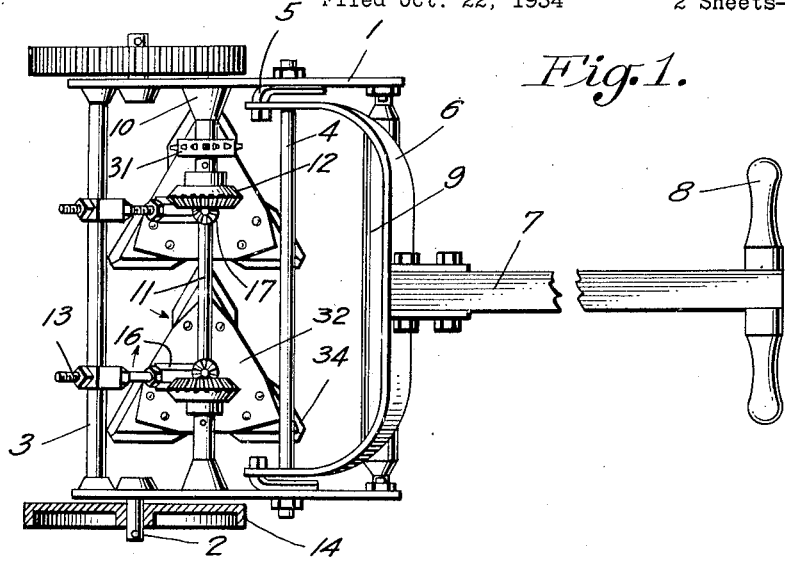

April 21, 1936.  L. O. HANSON  2,038,284
ROTARY MOWER
Filed Oct. 22, 1934  2 Sheets-Sheet 1

Inventor.
Louis O. Hanson, by
G. C. Kennedy,
Attorney.

April 21, 1936.  L. O. HANSON  2,038,284

ROTARY MOWER

Filed Oct. 22, 1934  2 Sheets-Sheet 2

Inventor:
Louis O. Hanson, by
G. C. Kennedy,
Attorney.

Patented Apr. 21, 1936

2,038,284

UNITED STATES PATENT OFFICE 2,038,284

ROTARY MOWER

Louis O. Hanson, Waterloo, Iowa, assignor of one-half to Hans T. Borsheim, Waterloo, Iowa Application October 22, 1934, Serial No. 749,459

14 Claims. (Cl. 56—255)

My invention relates to improvements in rotary mowers, and an object of my improvements is to supply a device of this class adapted to rapidly and effectively mow grass, or other vegetation, whether of dense growth, considerable height or with either light or relatively heavy stems, and without riding down the same uncut, or matting its components after cutting.

Another object of my improvements is to effect a working combination between the cooperating cutting devices, to insure perfected gathering for cutting of the material, followed by the cutting thereof and the propulsion of the material so cut rearwardly into either a windrow or into any receptacle suitably placed to receive it.

Another object of my improvements is to provide coacting rotary shearing cutters having a like construction but actuated for alternate action upon the material being cut while drawing the material backward as cut for rearwardly delivered alinement in a windrow or in delivery to a receptacle.

Another object of my improvements is to construct each shearing means with removable or exchangeable cutter blades in a desired plurality mounted around and upon a carrying member, the latter being shaped peripherally and in an edgewise relation to the material being cut so as to concurrently operate upon such cutting action on the material to gather and propel alternately the cut material to the rear.

Another object of my improvements is to provide means for driving the rotary cutters in co-action to accurately regulate the alternation of cutting actions of the oppositely rotating blades.

Another object of my improvements is to provide in my invention coacting oppositely rotatable cutting devices including cutter blades mounted and circumferentially spaced thereon and shaped with double edges, the cutting devices being interchangeably transposable for alternate use after such transposition of the unused edges of the blades, when the previously used edges before such transposition have in use become dull or mutilated.

Other objects of my improvements will be detailed hereinafter as the description of the mechanism proceeds.

It is to be noted that various changes may be effected in minor details of my invention, without, however, departing from the scope and protection of the claims.

I have accomplished the above objects in an actual reduction to practice, by the means which are hereinafter described and claimed, and which are illustrated in the drawings filed herewith.

Figure 2:
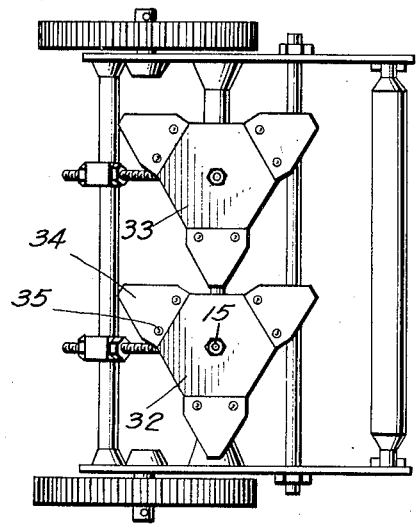
Figure 4:
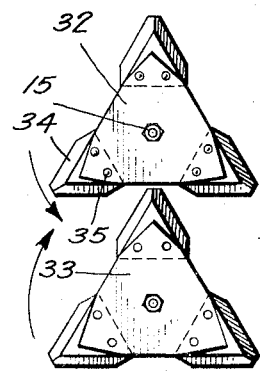
Figure 3:
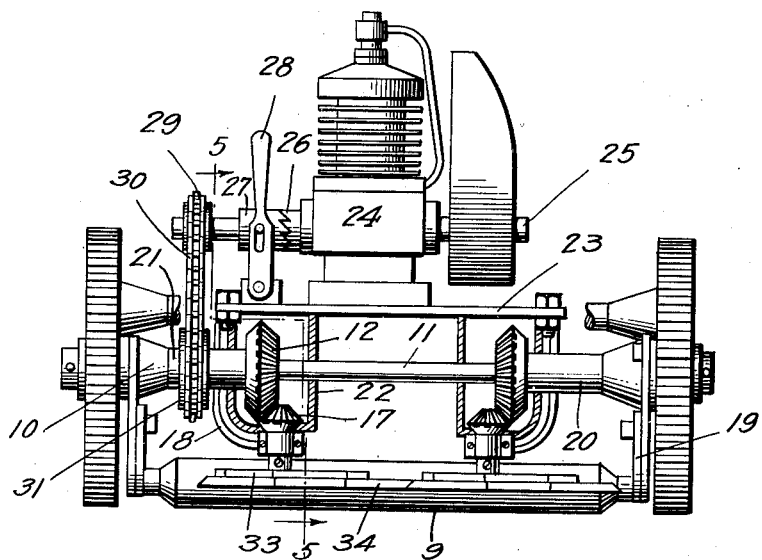
Figure 5:
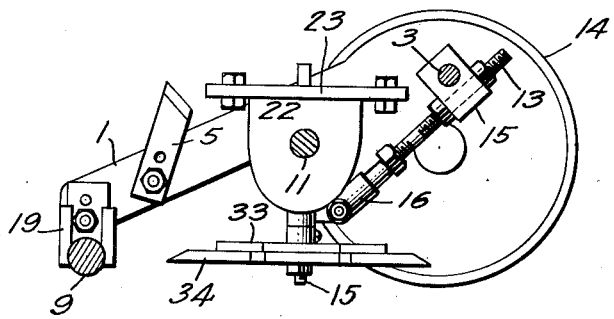

Fig. 1 is a top plan of my rotary mower, with parts removed or broken away, and parts in horizontal section. Fig. 2 is an under plan view of the same with various elements removed. Fig. 3 is a front elevation of the mower, with parts broken away. Fig. 4 is a diagram in top plan, of the cooperating cutting devices of my invention. Fig. 5 is a vertical longitudinal section of the mower, taken on the line 5—5 of Fig. 3 and looking in the direction indicated by the arrow, and both Figs. 3 and 5 are on a scale one and one quarter times that of Figs. 1, 2 and 4.

My improved mower has an open frame, rectangular, and having parallel side bars 1 with outwardly directed fixed spindles 2 on which are rotatably mounted the hubs of carrying wheels 14. The front ends of said bars are rigidly connected by a cross-rod 3, while the rear parts of the bars are also rigidly connected by a cross-rod 4. Fixed to the inner faces of the rear parts of said side-bars are inclined inwardly bent lugs 5 which loosely enter for some limited rocking movements slots in the forward terminations of furcations 6 mounted rigidly upon opposite sides of the forward end of a bar 7 having terminal handles 8. By this means the mower may be hand-propelled in use. The rear ends of the bars 1 have downwardly directed hangers, rigid therewith, and with adjustable extension members 19 mounted thereon having inner bearings which seat a rotatable ground-roller 9.

The medial parts of the bosses 1 have alined inwardly extending socketed bosses 10 in which are mounted the extremities of a rotatable shaft 11 which carries thereon a pair of like but reversed bevel gears 12 spaced apart and equally spaced respectively from said side-bars. A sprocket-wheel 31 is mounted upon the shaft 11. Bevel-pinions 17 are mounted on stub-shafts 15, vertically directed and supported by furcations 16 of a bolt-and-nut connection 13 adjustably mounted upon the forward cross shaft or rod 3. Upon the shafts 15 are mounted the lower ends of upwardly bent standards 18 whose upper ends are integral with spacing sleeves mounted upon the shaft 11.

Referring to Fig. 3, a platform 23 is rigidly supported upon sleeves fixed on the shaft 11, and a prime motor 24, an internal combustion engine, is mounted upon the platform. If desired an electric motor may be used instead. The motor shaft 25 carries a fixed clutch member 26 with which coacts a slidable clutch-member 27 loose on said shaft and actuable by means of a hand-lever 28 swingingly mounted on the platform 23 below. On the shaft 25 is also fixed a sprocket wheel 29 which, together with the sprocket wheel 31 carry a sprocket chain 30, and the sprocket-wheel 31 is upon a sleeve member 21 rotatable upon the shaft 11.

Upon the lower terminations of the vertical stub-shafts 15 are removably secured interchangeably transposable like but oppositely rotatable cutter carriers or members 32 and 33, which, however, are by their relative positions arranged as shown in Figs. 2 and 4, wherein these members which are of substantially triangular shape are adapted to cooperate together with their pluralities of cutter blades 34 in cutting grass or the like as the mower is propelled ahead. In their effective relation as shown, in one position of each member 32 and 33, one angle of the one is presented medially toward one side edge of the other. As the members are rotated oppositely by the means described in the directions inwardly shown by the arrows, their positions constantly change, and their polygonal cutters 34 sweep in turn to mow the standing material in repeated succession. The blades 34 may be of any desired configuration other than that shown, and may each be single or double edged, and may be removed for re-sharpening, transposing or substitutions. They are secured to the members 32 and 33 by rivets 35 or other or separable means. In the event that double-edged blades are used and the advancing edge of one or more blades is dulled or notched, the opposite unused edges of the blades may be employed in cutting by removing the carrier members 33 and transposing them interchangeably by securing them upon the depending shafts of the bevel pinions 17 opposite to their former positions. This is convenient in field use of the mower, to prevent delays or changing by procurement of previously unused and substituted members and assembled blade parts. It will be noted that in any positions of their rotations, these members and their projecting blades never interfere but have proper relative clearance, while the blades alternately cut the material while the wall-like side edges of the members 32 and 33 in following each sweeping cut of a blade 34 have a pushing action upon the already severed material, propelling it inwardly and rearwardly into a windrow behind the mower, or into any receptacle placed to receive it. The members 32 and 33 rotate more than four thousand times per minute.

The angles of the members 32 and 33 are preferably greater than the outer angles, truncated, of the cutter blades 34. This gives the advancing walls of the members 32 and 33 a more abrupt presentation toward the cut material already acted upon by the advancing edges of the blades which have just performed the cutting, so that the abruptly presented side walls of these members are caused to more effectively engage and push the cut material inwardly and then to the rear to deliver the same in the median line of the mower for reception within a following receptacle, or to shape in the rear an alined windrow. While I have shown the members 32 and 33 triangular, it is evident that they may be otherwise polygonal, with their blades 34 mounted upon their apical angles. When the members shown are removed, and others substituted with a different plurality of angles and blades thereon, the changes subserve different purposes in the cutting of different kinds of materials, whether lightly or thickly stemmed, and according to the chosen speed of rotation of the cutters.

When desired, mechanism may be combined with the essential elements shown, to propel the mower along, and without departing from this invention. Furthermore, instead of removable cutter blades, the members 32 and 33 may be made with sharpened edges, and used with or without pushing parts therealong or upon them to perform the services heretofore described.

I claim:

1. In a mower, oppositely inwardly rotatable angular plates in the same plane and supported for transportation, and blades mounted peripherally upon and to project from the plates and relatively positioned with each other on said plates to clear each other while in rotation.

2. In a mower, oppositely inwardly rotatable polygonal members transversely spaced with respect to the longitudinal center line of the device, with non-radial cutting edges positioned with their advancing edges directed for alternate action upon material to be cut between the members during the forward advance of said members.

3. In a mower, oppositely inwardly rotatable polygonal carrier members transversely spaced with respect to the longitudinal center line of the device, and angular cutters mounted removably upon said members to project therebeyond radially with certain of their edges positioned non-radially for alternate coaction successively of their cutters upon material to be cut against which said devices are propelled, and for clearance relatively to each other.

4. In a mower, oppositely inwardly rotatable polygonal carrier members transversely spaced with respect to the longitudinal center line of the device, and double-edged angular cutters of substantially triangular shape mounted removably upon said members and to alternate within their interspace of travel for mutual clearance.

5. In a mower, oppositely inwardly rotatable transposably interchangeable carrier devices in the same plane and having like projecting double-edged cutters thereon spaced apart circumferentially to have their advancing like edges only act upon material to be severed between them.

6. In a mower, a pair of oppositely inwardly rotatable carrier members transversely spaced with respect to the longitudinal center line of the device of like shape peripherally, and cutter blades mounted radially in spaced relation around and beneath each member, with the blades on the members for alternate action upon material to be cut between them, and the advancing edge parts of each of said members directed outwardly at an angle relative to the medial radii of said blades, the edge parts of said members providing shoulders to serve as sweeps against said material when cut to propel the same medially only between the members to a place of deposit.

7. In a mower, a pair of oppositely inwardly rotatable like-shaped carrier members transversely spaced with respect to the longitudinal center line of the device having a substantially triangular shape with projecting double-edged substantially triangular blades mounted removably upon their angular parts, the side wall parts of the angles of said members approaching each other at a greater angle than the width of the angle of each blade to serve as sweeps against material cut by the blades to propel the cut material medially rearwardly only between the members rearwardly to a place of deposit.

8. In a mower, a pair of oppositely rotatable like carrier members transversely spaced with respect to the longitudinal center line of the device of polygonal shape with cutters mounted removably and transposably upon and to project therefrom, the members and their cutters being spaced and positioned relatively to each other for their cutters to alternate in action upon material to be cut between them with operative clearance, and adjustable controllable means for rotating said members in opposite directions.

9. In a mower, a pair of oppositely rotatable like carrier members transversely spaced with respect to the longitudinal center line of the device with oppositely edged cutters mounted removably upon and to project therefrom with edges directed non-radially, the members and their cutters being spaced and positioned relatively to each other for their cutters to alternate in action between each other upon material to be cut for operative clearance with each other and advancing edge parts of said members also being peripherally formed to serve as sweeps for propelling the material as cut between them rearwardly to a place of deposit, said members being mounted for transportation and for vertical adjustments, and controllable motor mechanism adapted to actuate said members.

10. In a mower, in combination, coacting rotary cutting devices transversely spaced with respect to the longitudinal center line of the device mounted on means for transportation, each of said devices having a plurality of peripheral beveled double-edged triangular blades for alternately operating upon material to be severed, and coacting to expel therebetween the severed material.

11. In a mower, in combination, coacting removable rotary cutting and oppositely rotatable cutting devices transversely spaced with respect to the longitudinal center line of the device mounted for transportation and having cutting blades extending therefrom to exercise a drawing cut upon material between the devices when the same are propelled in one direction, said devices being provided with edges inclined rearwardly relative to their directions of rotation, and arranged for alternate cutting actions upon the material and having non-radial side walls to also engage and expel the severed material from the cutters in a desired direction.

12. In a mower, in combination, means of transportation, cooperating interchangeably transposable removable oppositely rotatable cutting devices transversely spaced with respect to the longitudinal center line of the device mounted thereon to act alternately upon material to be severed against which the devices are propelled, mechanism for rotating said devices oppositely, means for making or breaking connection between said mechanism and devices, adjustable connections between said means of transportation and said cutting devices for adjusting the height of cut of said devices, and said cutting devices being removable outwardly projecting cutters mounted thereon in spaced relation with edges inclined rearwardly relative to their directions of rotation to exert drawing cuts upon said material, and polygonal plates on which the cutting devices are removably reversibly secured and the plates having side walls directed for exerting a drawing push against the material when so cut to propel the same in a desired direction and with a free clearance of expulsion.

13. In a mower, a transportable structure, and interchangeable removably transposable coacting double-edged cutting devices in the same plane and mounted for opposite rotation on said structure.

14. In a mower, a transportable structure, and interchangeable removably transposable coacting like beveled double-edged cutting devices in the same plane and mounted for opposite rotation on said structure.

LOUIS O. HANSON.